United States Patent [19]

Bigbee et al.

[11] Patent Number: 4,760,806

[45] Date of Patent: Aug. 2, 1988

[54] CONSERVATION OPENER

[75] Inventors: Marvin L. Bigbee, Ankeny; Marvis L. Ridgely, Des Moines; Michael D. Snyder, Ankeny, all of Iowa

[73] Assignee: Deere & Company, Moline, Ill.

[21] Appl. No.: 866,543

[22] Filed: May 22, 1986

[51] Int. Cl.[4] .............................................. A01C 5/06
[52] U.S. Cl. ........................................ 111/87; 111/85
[58] Field of Search .................. 111/85, 87, 88, 14, 111/86, 79, 7

[56] References Cited

U.S. PATENT DOCUMENTS

| | | | |
|---|---|---|---|
| 713,616 | 11/1902 | Dobbin | 111/87 |
| 967,341 | 8/1910 | Dempster et al. | 111/87 |
| 1,056,386 | 3/1913 | Wheeler | 111/87 |
| 1,116,525 | 11/1914 | Winwood | 111/87 |
| 1,229,194 | 6/1917 | Patric | 111/87 |
| 1,262,283 | 4/1918 | Sturrock | 111/87 |
| 1,940,273 | 12/1933 | Schwab . | |
| 2,332,012 | 10/1943 | Rasmussen | 111/88 X |
| 2,577,775 | 12/1951 | Lemmon et al. | 111/85 |
| 2,685,243 | 8/1954 | Cole | 111/88 X |
| 2,691,353 | 10/1954 | Secondo | 111/87 X |
| 2,869,489 | 1/1959 | Buhr . | |
| 2,917,012 | 12/1959 | Oehler et al. | 111/87 |
| 2,920,587 | 1/1960 | Shriver . | |
| 3,213,812 | 10/1965 | Forsyth et al. | 111/87 X |
| 3,499,495 | 3/1970 | Pust | 111/88 X |
| 3,611,956 | 10/1971 | Moore et al. . | |
| 3,658,018 | 4/1972 | Connor | 111/88 |
| 4,031,834 | 6/1977 | Klenke . | |
| 4,207,823 | 6/1980 | Steilen et al. | 111/85 |
| 4,331,205 | 5/1982 | Sorenson et al. | 111/85 X |
| 4,366,760 | 1/1983 | Dreyer . | |
| 4,407,207 | 10/1983 | Dreyer . | |
| 4,408,551 | 10/1983 | Keller et al. . | |
| 4,422,392 | 12/1983 | Dreyer et al. . | |
| 4,423,788 | 1/1984 | Robinson, Jr. et al. | 111/85 X |

FOREIGN PATENT DOCUMENTS

| | | | |
|---|---|---|---|
| 206992 | 11/1956 | Australia | 111/88 |
| 245852 | 3/1966 | Austria | 111/87 |
| 117745 | 9/1984 | European Pat. Off. | 111/85 |
| 140264 | 5/1985 | European Pat. Off. | 111/85 |
| 869706 | 3/1953 | Fed. Rep. of Germany | 111/85 |
| 2925838 | 1/1981 | Fed. Rep. of Germany | 111/85 |
| 2408288 | 7/1979 | France | 111/87 |
| 1014498 | 4/1983 | U.S.S.R. | 111/88 |
| 1018591 | 5/1983 | U.S.S.R. | 111/88 |
| 1027852 | 1/1984 | U.S.S.R. | 111/87 |

OTHER PUBLICATIONS

"Coulters For High Speed Drills", M. P. Nabatyan Moore Uni-Drill Brochure, 1969.
"No-Till Direct Drill Coulter", Geelong Brochure, Price Bros. Equipment Inc.
"Installing Depth Bands", John Deere-Van Brunt Fertilizer Grain Drill Model FB-A, Pre Delivery Instructions, p. 10, 9/56.

Primary Examiner—Robert A. Hafer
Assistant Examiner—Danton D. DeMille

[57] ABSTRACT

A single disk opener blade is supported for rotation about a horizontal axis offset approximately seven degrees from the transverse direction. A seed tube extends closely adjacent the disk blade forwardly of the rotational axis generally in the shadow of the leading edge of the blade. The tube is angled around the disk blade hub to provide a narrow profile and to reduce the vertical velocity of the material deposited in the furrow. A furrow-firming and blade-scraping extension is connected to the lower end of the tube and extends rearwardly to a location behind the axis. The side of the firming extension is located transversely beyond the shadow of the disk blade to help form one side of the seed trench and to permit the seed to settle in the trench. Depth control structure includes a wheel support arm fixed to one end of the disk blade spindle and a quadrant fixed to the opposite end of the spindle for selectively adjusting the arm. A depth control wheel is mounted on the arm about an axis offset from the axis of the disk blade for rotation against the leading side of the blade to clean the blade, hold down trash and dirt, and provide positive depth control.

25 Claims, 4 Drawing Sheets

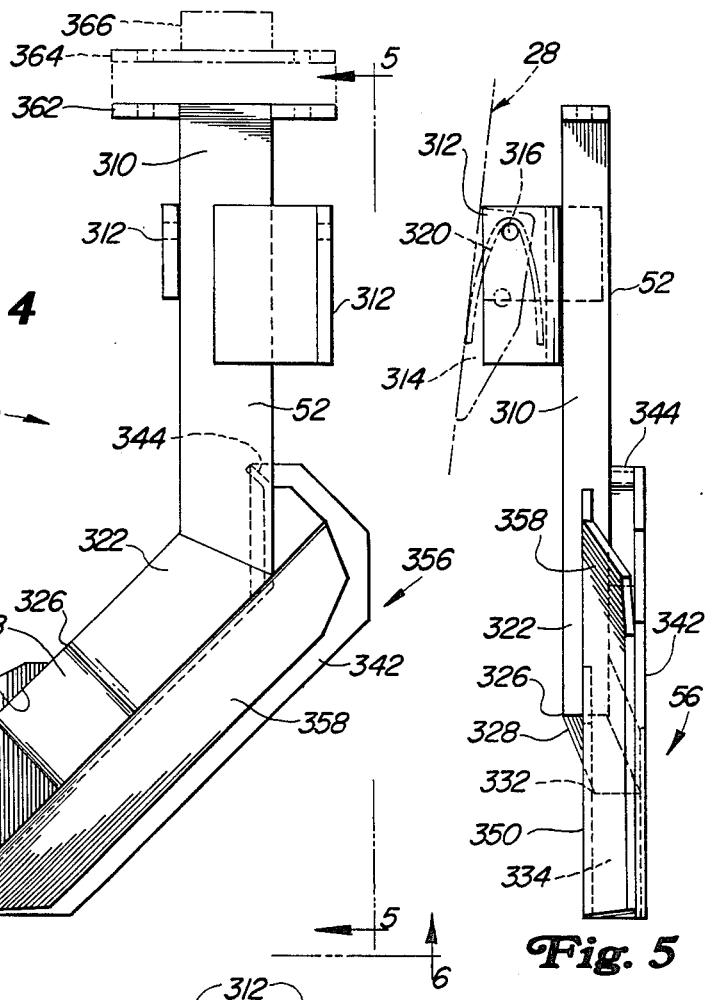

CONSERVATION OPENER

BACKGROUND OF THE INVENTION

The present invention relates generally to opener assemblies for forming a trench and depositing seed or fertizer therein, and more specifically, to a disk blade opener for conservation tillage applications where trash and/or stubble and the like are present or the surface of the ground.

Conservation tillage practices have become more widespread in recent years, and are utilized to conserve moisture, prevent erosion, and reduce the number of trips over the field. With such practices, the amount of trash and residue left on the soil surface is increased. Ideally the amount of soil moved during the seeding or fertilizing operation is minimized to prevent disturbance of any chemicals that have been applied and reduce plugging problems which are aggravated by the trash, particularly when the opener devices are narrowly spaced.

Commercially available conversation tillage grain drills such as the Moore Uni-Drill utilize large disk openers which are mounted on either side of a drag arm at opposite angles and are inclined both in the horizontal and vertical planes to slice through surface residue and open a slit in the soil. A seed tube coulter holds the slit open while seeds are dropped into the seed bed formed in the slit. Such a drill utilizes a weight transfer system to control the depth of the slit, and therefore depth control and seed placement can vary substantially with varying soil characteristics. In certain conditions, soil can be thrown from the side of the disk, adversely effecting seed planting characteristics, particularly when narrow row spacings are utilized.

Other single disk type of openers have been utilized to form a furrow in the soil, but most suffer from some disadvantages when utilized in conversation tillage applications. Devices such as shown in U.S. Pats. Nos. 4,031,834 and 2,869,489 utilize boot or shoe structures which extend rearwardly behind the disk and increase trash and side bend problems. These devices and other ones such as shown in U.S. Pat. No. 1,940,273 also utilize concave disks which tend to throw more soil. Concave disks have more difficulty slicing through thick trash, and precise depth control is a problem. In other structures such as shown in U.S. Pat. No. 2,920,587 a flat seed furrow opening disk is utilized in combination with a flat fertilizer opening disk, and depth control is provided by a band attached to the fertilizer disk. In such a structure, gauging can be less than optimum since the gauge band is offset from the seed furrow opening disk. The band is not adjustable to vary the depth of penetration of the fertilizer disk, and scrapers are necessary to keep the band clean for proper depth gauging action. Such a disk arrangement also disturbs more soil, thus causing more potential trash problems as well as decreasing the amount of moisture maintained in the soil.

OBJECTS OF THE INVENTION

It is therefore an object of the present invention to provide an improved furrow opener for a grain drill or similar implement. It is yet another object to provide such an opener which is better able to handle trash and which disturbs less soil than at least most prior art opener devices.

It is another object of the present invention to provide an improved furrow opener having both good trash-handling and accurate seed placement capabilities while at the same time maintaining a narrow profile for good operation when narrowly spaced rows of seed are being planted or when double cropping. It is another object to provide such an opener which permits the seed to settle uniformly into the furrow. It is still another object to provide such an opener with a unique arrangement of disk blade, gauge wheel, seed tube and press wheel assemblies which provides a narrow profile and relatively short fore-and-aft dimension while maintaining reliable depth-controlled seed placement.

It is yet another object of the present invention to provide an improved conservation tillage opener which reduces the incidence of dirt and trash buildup on the disk and which has an increased ability to cut through thick trash with decreased soil throw. It is a further object to provide such an opener with an effective depth control arrangement which is convenient to operate, and is simple and compact in construction.

It is yet another object of the present invention to provide a conversation opener having an improved furrow-forming structure. It is another object to provide such an opener having an improved seed tube assembly which facilitates a narrow opener profile, helps to establish an improved furrow and aids in proper placement of the seed deep within the furrow. It is a further object to provide such an opener which minimizes fore-and-aft dimension to reduce side bend forces and enhance the ability to plant uniformly even while the implement turns from the forward direction. It is another object to provide such an opener with an improved press wheel assembly having an improved down pressure adjustment.

BRIEF DESCRIPTION OF THE INVENTION

In accordance with the above objects, a flat, single disk blade or coulter is supported at the lower end of an opener arm assembly connected to a rockshaft or cross beam on the implement frame. The arm assembly supports the disk blade in a substantially vertical attitude for rotation about an axis which is angled with respect to the transverse direction, that is, the direction transverse to the forward direction approximately seven degrees to define forwardly and rearwardly directed blade sides. Each arm assembly is individually biased downwardly by a compression spring assembly. A gauge wheel mounted for rotation against the forward side of the disk blade is supported by depth adjusting structure which includes a spindle that also rotatably mounts the disk blade. An arm is fixed at one end to one side of the spindle and the other end supports the gauge wheel. A quadrant is fixed to the opposite side of the spindle for adjusting the gauge wheel relative to the disk blade. The gauge wheel includes a flexible tire with a lip which cleans the surface of the disk blade. The bottom surface of the tire presses down trash and reduces dirt flow adjacent the forward side of the blade. A seed or fertilizer tube pivotally connected to the arm assembly extends downwardly adjacent the hub of the disk blade at a location ahead of the spindle which supports the disk blade. At a location generally aligned horizontally with the spindle, the seed tube extends downwardly and angles transversely toward the rearwardly directed or shadow side of the blade. A furrow-forming and blade-scraping extension connected to the lower end of the seed tube is biased by a leaf spring located between the seed tube and arm assembly toward the rearwardly directed side of the blade slightly outwardly of the leading edge of the furrow-forming portion of the blade to clean the side of the blade, to help firm the soil on the corresponding side of the furrow and to help place seed deeply and uniformly within the furrow. The extension terminates behind the spindle axis but substantially forwardly of the rearmost portion of the blade to maintain a relatively small fore-and-aft opener dimension which helps eliminate side bend forces and planting irregularities when the implement is turned from the forward direction. The opener arm assembly which is utilized for seeding includes an extension portion located above the spindle. The portion extends rearwardly to a pivotal connection with at least one arm which supports an angled press wheel for firming the soil over the seed on one side of the formed furrow. The press wheel is turned slightly to scrub soil toward the furrow for more aggressive closing action. A torsion spring adjustably urges the press wheel into contact with the soil and includes a grip member at one end for conveniently adjusting down pressure.

The upright disk blade and compression spring assembly provide good soil penetration while the gauge wheel assures even depth of penetration and reduced dirt throwing and trash buildup problems in heavy residue. The depth of penetration of the furrow-forming assembly can be controlled accurately and easily by rotating the spindle with the quadrant arrangement. The depth adjustment is compact in design and provides a wide range of depth settings. The individual compression spring assemblies permit more flexibility than at least many available conservation tillage devices.

These and other objects, features and advantages of the present invention will become apparent to those skilled in the art from the description which follows and from the drawings.

BRIEF DESCRIPTION OF THE DRAWINGS

FIG. 4 is an enlarged side view of the seed tube of the present invention.

FIG. 5 is a view taken substantially along lines 5—5 of FIG. 4.

FIG. 6 is a view taken substantially along lines 6—6 of FIG. 4.

DESCRIPTION OF THE PREFERRED EMBODIMENT

Figure 1:
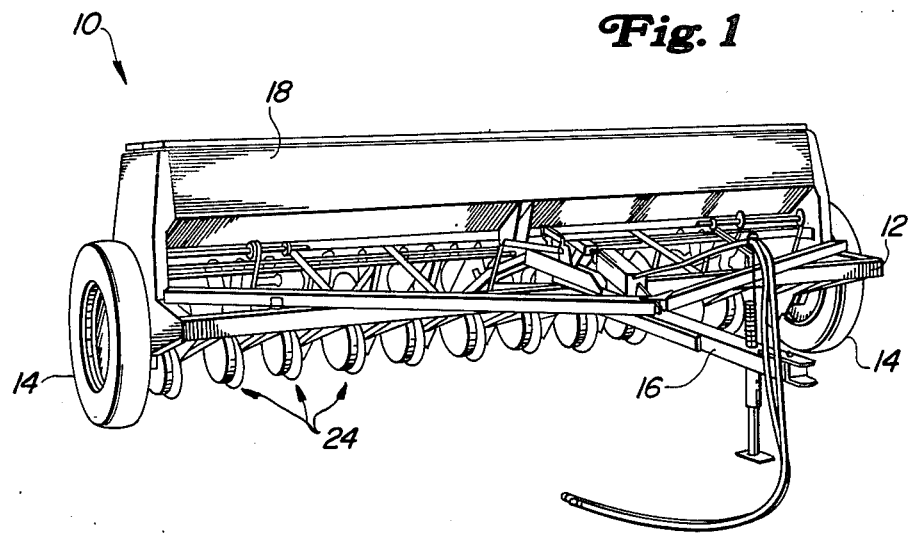
FIG. 1 is a perspective view of an implement with the opener assembly of the present invention attached thereto.
Figure 2:
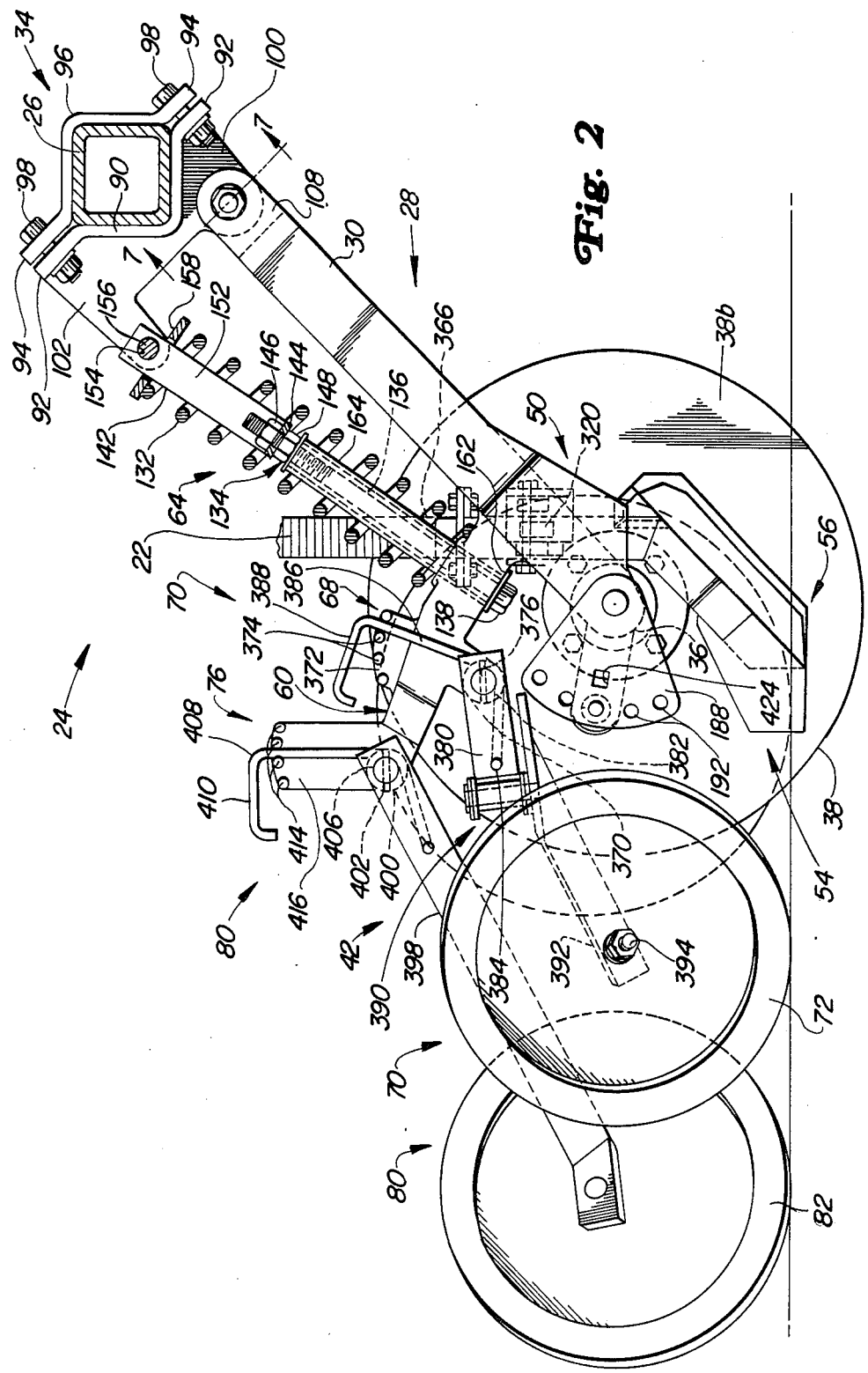
FIG. 2 is an enlarged side view of the opener assembly utilized on the implement of FIG. 1.

Referring now to FIG. 1, therein is shown a grain drill 10 having a main frame 12 supported for forward movement over soil where trashy conditions may be present by end wheels 14. The grain drill 10 includes a forward hitch 16 adapted for connection to a towing vehicle such as a tractor. A hopper 18 contains material such as seed grain or fertilizer which is metered through hoses 22 (FIG. 2) to furrow-forming assemblies 24 which are connected to an adjustable rockshaft 26 mounted on the frame 12. Although a grain drill 10 is shown, the opener assemblies 24 may be used with other implements, such as an air seeder in which case the assemblies 24 may be mounted on a fixed portion of the seeder frame. The opener assemblies 24 provide narrow furrows in the soil and deposit the material from the hoses 22 in the furrows.

Figure 3:
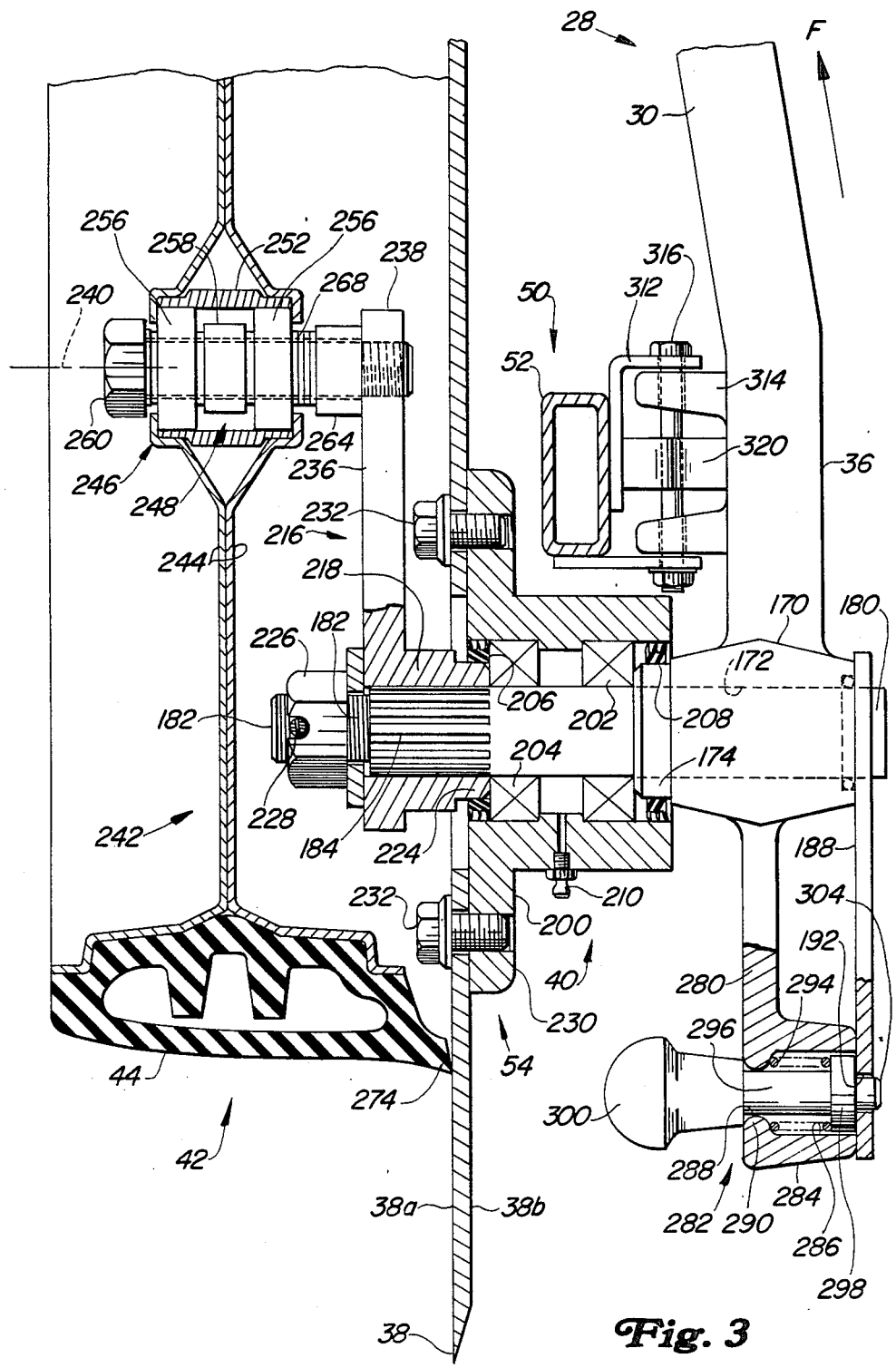
FIG. 3 is an enlarged view partially in section showing the disk blade and adjustable gauge wheel assembly.

The furrow-forming assemblies 24 include an opener arm or drawbar assembly 28 with a main arm 30 pivotally connected to the rockshaft 26 by a bracket assembly 34. The opener arm assembly 28 extends rearwardly and downwardly from the bracket assembly 34 to a lower aft end 36 which rotatably mounts a coulter or flat disk blade 38 on a spindle and hub assembly 40 (FIG. 3). The coulter 38 is supported for rotation about a generally horizontal axis which is offset approximately seven degrees from the transverse direction (that is, the direction transverse to the forward direction F of FIG. 3 and generally parallel to the longitudinal extent of the implement 10) to define forwardly directed and rearwardly directed blade surfaces 38a and 38b, respectively. A gauge wheel assembly 42 is mounted for rotation about an axis generally parallel to but offset from the axis of rotation of the coulter 38 for providing depth control, preventing dirt throw adjacent the forwardly directed surface 38a, and cleaning the surface 38a.

A seed boot assembly 50 is connected to the the opener arm assembly 28 forwardly of the rotational axis of the coulter 38. The seed boot assembly 50 includes a seed tube 52 which extends downwardly closely adjacent the forward portion of the spindle and hub assembly 40 and then angles inwardly around the hub and rearwardly toward the lower portion of the coulter 38 below the rotational axis of the coulter in the shadow area 54 of the leading edge of the coulter. A furrow-firming and coulter-scraping extension 56 is connected to the lower end of the seed tube 52 for firming the side of the furrow which faces the coulter side 38b, for scraping the side 38b and for accurately placing the seed or other material in the furrow formed by the coulter 38.

The opener arm assembly 28 includes an upwardly and rearwardly extending portion 60 which supports the lower end of a compression spring assembly 64. The upper end of the compression spring assembly 64 is connected to the bracket assembly 34. The assembly 64 biases the opener arm assembly 28 downwardly about its connection with the bracket assembly 34 to urge the coulter 38 into furrow-forming relationship with the soil, with the furrow depth being determined by the gauge wheel assembly 42.

The extension portion 60 also includes a first trailing press wheel support 68 for adjustably mounting a press wheel assembly 70 supporting a press wheel 72 for rotation in the formed furrow to firm the soil over the deposited material. In the embodiment shown, a second trailing press wheel support 76 is carried on the extension portion 60 rearwardly and above the first support 68 and mounts a second press wheel assembly 80 rotatably mounting a second press wheel 82 at an angle for scrubbing soil towards the furrow and for firming the soil on the side of the furrow.

A more detailed description of the furrow-forming assembly 24 now follows. The bracket assembly 34 includes an anchor 90 in the form of an angle adapted to fit against the rearward and bottom faces of the rockshaft 26. The anchor 90 includes end flanges 92 adapted to mate with end flanges 94 on a cap 96. The cap 96 is also in the form of an angle adapted to fit against the upper and forward faces of the rockshaft 26. The flanges 92 and 94 are apertured, and after the anchor 90 and cap 96 are positioned on the rockshaft 26, the apertures are aligned to receive bolts 98 which secure the cap and anchor on the rockshaft 26. An apertured arm support 100 is connected to and extends downwardly from the lower face of the anchor 90. A spring assembly support 102 is connected to and extends rearwardly from the upright portion of the anchor 90.

Figure 7:
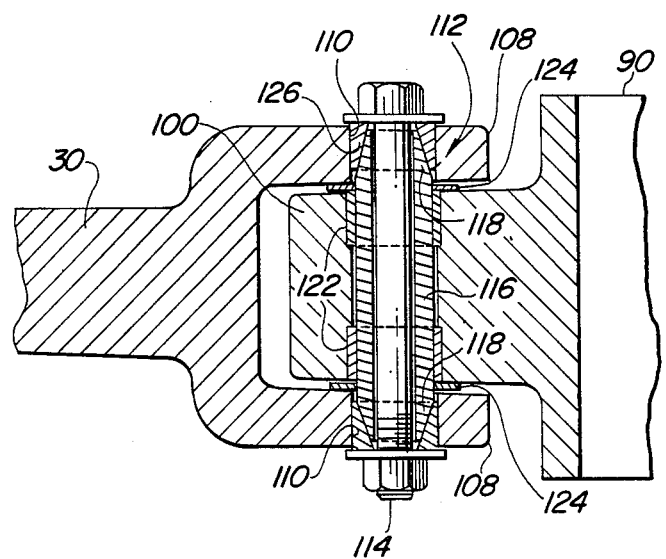
FIG. 7 is a view taken substantially along lines 7—7 of FIG. 2.

The upper forward end of the arm assembly 28 is bifurcated at 108 and includes apertures 110 (FIG. 7) which are positioned on opposite sides of the arm support 100. A tapered bearing assembly 112 and pivot bolt 114 extending through the apertures 110 and the aperture in the arm support 110 rockably connect the arm assembly 28 to the bracket assembly 34. A pin 116 with tapered ends 118 is inserted through the aperture in the arm support 100. Spacers 122 are inserted over the pin 116 and extend slightly outwardly of the sides of the support 100. Washers 124 are inserted over the pin 116 between the bifurcated end 108. The tapered ends of the pin 116 extend into the apertures 110 of the ends 108 and a tapered bushing 126 is inserted over the tapered ends and the apertures 110 to provide a sturdy pivot area with little sidesway.

The spring assembly 64 (FIG. 2) includes a spring 132 compressed between the support 102 and the extension portion 60 adjacent the lower end of the opener arm assembly 28. A tension link assembly 134 extends through the compression spring 132 and includes an elongated bolt 136 inserted through the aperture in the extension portion 60 and having a headed end 138 located adjacent the aft face of the portion 60 when the arm assembly is rocked to its lowermost position. An upwardly extending U-strap 142 includes a bight portion 144 which is apertured to receive the threaded end of the bolt 136. Nuts 146, 148 secure the U-strap 142 to the bolt 136. The strap 142 includes side legs 152 which are apertured at 154. The side legs 152 are pivotally connected to the spring assembly support 102 by a pivot pin 156 which extends through the apertures 154 and through the aperture in the support 100. The upper end of the spring 132 bears against a plate 158 which is received over the side legs 152 and bears against the pivot pin 156. The bottom of the spring 132 abuts the extension portion 60. A spacer 164 carried on the bolt 136 extends through the extension portion 60 and is secured between the bight portion 144 of the U-strap 142 and a washer 162. The headed end 138 of the bolt 136 and the washer 162 prevent the arm assembly 28 from rocking downwardly below the preselected lowermost position. As the arm assembly 28 rocks upwardly against the bias of the spring 132, the end of the bolt 136 and spacer 164 can slide relative to the extension portion 60.

The lower end of the arm assembly 28 includes an enlarged spindle-receiving area 170 (FIG. 3) having a cylindrical bore 172, the axis of which is generally horizontal and offset from the transverse direction by approximately seven degrees. The inward side (left-hand side as viewed in FIG. 3) of the area 170 includes a reduced sized projection 174. A spindle or shaft 180 having a diameter approximately equal to the diameter of the cylindrical bore 172 is inserted into the bore 172 and extends inwardly beyond the projection 174 to a threaded end 182 of reduced diameter. A splined portion 184 is located adjacent the threaded end 182. A generally planar, apertured quadrant 188 is fixably mounted on the outward end of the spindle 180 for rotation therewith in a plane perpendicular to the axis of the spindle 180. A series of apertures 192 are spaced about the periphery of the quadrant at equal radial distances from the axis of the spindle 180 for providing angular adjustment of the spindle as will be described in detail later.

The spindle and hub assembly 40 also includes a coulter hub 200 rotatably mounted on the inward projection of the spindle 180 by bearings 202 and 204. The outer end of the hub 200 extends around the projection 174 of the spindle-receiving area 170. Triple lip seals 206 and 208 are located outwardly adjacent the bearings 202 and 204, respectively, within the hub bore. The seal 208 is pressed onto the projection 174. A grease fitting 210 is provided for lubricating the bearings 202 and 204.

An arm assembly 216 is fixed to the splined end 184 of the spindle 180 and includes a splined portion 218 which fixes the assembly 216 for rotation with the spindle 180. The assembly 216 also includes an outwardly directed projection 224 which projects in part into the bore of the hub 200 and supports the lip seal 206. A slotted nut 226 is threaded onto the end 182 of the spindle 180 to secure the arm assembly 216 in position on the spindle 180 and to prevent substantial axial movement of the spindle 180 within the bore 172. The threaded end 182 is apertured to receive a pin 228 which maintains the nut 226 in the preselected threaded position for the proper tolerances in the spindle and hub assembly 40.

The hub 200 includes a radial flange 230 which is apertured at several locations for mounting the coulter 38 with bolts 232. Preferably the coulter 38 is flat, approximately eighteen inches in diameter and supported for rotation in a vertical plane about an axis offset about seven degrees from the transverse direction.

The arm assembly 216 includes an arm 236 extending upwardly and rearwardly from the portion 218 perpendicular to the axis of the spindle 180. The gauge wheel assembly 42 in connected to the radially outwardmost end 238 of the arm 236 for rotation about an axis 240 which is generally parallel to but offset from the axis of the spindle 180.

The gauge wheel assembly 42 includes a wheel 242 fabricated from a pair of generally identical wheel halves 244 connected face to face and defining wheel hub 246. A bearing assembly 248 is secured within the hub 246 and includes a bushing 252 fixed to the hub 246 and a pair of bearings 256 transversely spaced by a spacer 258. A bolt 260 is inserted through the bearings 256 and bushing 258 and is threaded onto the end 238 of the arm 236. A projection 264 extends from end 238 towards the hub 248. Washers 268 are selectively placed at either end of the bearing assembly 248 to properly space the wheel 242 with respect to the coulter 38 for a good fit of the tire 44 against the coulter 38. The tire 44 is fabricated from a flexible material, preferably 65 durometer rubber, and includes a lip 274 projecting toward the coulter 38 and adapted to engage the leading coulter surface 38a as the coulter 38 rotates in the soil to form the furrow. The tire 44, which preferably has a diameter of at least eighty percent that of the coulter 38, provides depth adjustment for the coulter, holds down soil and trash as the coulter is rotated through soil and wipes the leading face 38a of the coulter to prevent dirt buildup. The rotation of the tire 44 against the coulter 38 also helps to keep the coulter 38 rolling in adverse soil and trash conditions.

Coulter depth adjustment is made by rotating the spindle 180 thereby changing the relative locations of the axis 240 with respect to the spindle axis. The opener arm assembly 28 includes a rearward extension 280 supporting a spring-loaded quadrant-engaging member 282 for securing the quadrant and thus the gauge wheel assembly 42 in a preselected position for the desired depth of penetration of the coulter 38. The extension 280 includes an enlarged end 284 having a cylindrical bore 286 with a reduced diameter aperture 288 which defines a ledge portion 290. A spring 294 is supported within the bore 286 and has an inwardmost end supported against the ledge 290. A pin 296 has a threaded end which extends through the aperture 288. The pin 296 includes an enlarged portion 298 slidably received within the bore 286 and biased outwardly by the spring 294. A knob 300 is threaded onto the end of the pin 296 and contacts the ledge portion 290 to prevent the enlarged portion 298 from extending outwardly beyond the bore 286. An aperture-engaging pin 304 extends outwardly from the enlarged portion 298 and engages a selected one of the apertures 192 on the quadrant 188. By pulling the knob 300 against the bias of the spring 294, the pin 304 is retracted from the quadrant 18 so that the spindle 180 may be rotated to change the location of the wheel 44. When the proper depth adjustment is made, the knob 300 is released and the pin 304 engages the selected one of the apertures 192 to lock the spindle 180 against rotation.

Preferably the arm assembly 28 including the bifurcated end 108, the arm 30, the extension portion 60 and the rearward extension 280 are cast as a unitary structure. The lower aft end 36 is angled (FIG. 3) with respect to the axis of the arm 30 to provide the seven degrees offset from the transverse direction.

The seed boot assembly 50 (FIGS. 3-6) includes the seed tube 52 which has a straight, upper connecting portion 310 which pivotally attaches to the opener arm assembly 28 forwardly adjacent the end 36 and transversely adjacent the lower portion of the extension portion 60. The seed tube 52 is generally rectangular in cross section with the narrowest sides extending generally transverse to the forward direction for a narrow profile. The upper portion 310 includes an apertured seed tube bracket 312. A mating bracket 314 which is cast with the arm assembly 28 and is apertured at a pair of vertically offset locations projects outwardly from the side of assembly 28, and a pin 316 is inserted through one pair of the apertures in the bracket 314 and through the apertures in the bracket 312 to mount the seed tube 52 on the arm assembly 28. A leaf spring 320 is inserted over the pin 316 between the side of the arm assembly 28 and the side of the seed tube 52 to urge the seed boot assembly 50 towards the surface 38b of the coulter 38. The upper portion 310 of the seed tube 52 extends downwardly adjacent the flange 230 of the hub 200 to a location forwardly of and slightly below the axis of the spindle 180. The portion 310 then connects with a short angled portion 322 which extends downwardly and rearwardly adjacent the flange 230. At a location 326 just beyond the flange 230, the seed tube 52 angles inwardly around the periphery of the flange 230 towards the side of the coulter 38. This short inwardly angled portion, indicated generally at 328, is connected at location 332 to an end portion 334 having a rearwardly directed opening 338 closely adjacent the surface 38b of the coulter 38. The opening 338 is located directly below the axis of the spindle 180. The firming and scraping extension 56 extends the seed path rearwardly below the spindle 180 to allow the seed to settle for good placement in the furrow formed by the coulter 38. The extension 56 includes an inward scraping portion 342 welded or otherwise connected to the lower edge of the end portion 334 and extending upwardly and forwardly therefrom generally along a plane closely adjacent and parallel to the plane of the rearwardly directed surface of the coulter 38. At the upper forward end of the scraping portion 342, an inwardly directed tab 344 is connected to the portion 310 of the seed tube 52.

On the opposite side of the seed tube 52, the extension 56 includes a soil-deflecting plate 350 which extends rearwardly from the outlet opening 338 generally parallel to the coulter 38. The plate 350 is welded to the end portion 334 and at location 354 angles inwardly adjacent the lower edge of the seed tube 52 to form with the scraping portion 342 a generally wedge-shaped leading section 356 adjacent the lower portion of the seed tube 52. An inclined surface 358 is thus defined, the outermost portion of which extends slightly outwardly of the shadow area 54 of the leading edge of the coulter 38 to help firm the soil and prepare a good seed-bed for the seed being deposited therein. The plate 350 is notched at 360 to permit the seed tube 52 to angle inwardly at the portion 328 across the plane of the plate. The aft portion of the plate 350 provides an extended seed deposit area to keep loose soil from dropping in the furrow before the seed has settled and yet terminates forwardly of the aft edge of the coulter 38 for reduced side bend forces. By angling the seed tube 52 around the hub 200, a narrow profile can be maintained for the furrow-forming assembly, and the change in direction off-axis at the angled portion 328 helps to slow the seed or other deposited material for better placement in the furrow formed by the disk blade 38 and the wedge-shaped surface 356.

A plurality of apertures are provided in the bracket 314 so that the seed boot assembly 50 may be adjusted vertically to achieve the best material placement for the given conditions. For example, when the coulter 38 is raised to just skim the top of the soil, the boot assembly may be lowered so that the extension 56 is closely adjacent the lowermost edge of the coulter. The upper end of the seed tube 52 is flanged at 362 for mating with a complimentary flange 364 of an extension or adapter member 366. The member 366 provides the proper angle of inclination and length for connection of the seed tube 52 to the corresponding delivery hose 22.

The first press wheel support 68 includes a lower pivot bearing area 370 located above the lower aft end 36 of the arm assembly 28. An upwardly projecting plate 372 extends above the bearing area 370 and includes a plurality of pins 374 which define a set of spaced notches therebetween. The press wheel assembly 70 includes a pivot pin 376 extending through the bearing area 370. An arm 380 is fixed to the end of the pivot pin 376 and a torsion spring 382 encircles the pin 376 between the area 370 and the arm 380. The spring 382 includes a first end 384 connected to the arm 380 and a second notch-engaging end 386 having a hand grip member 388 projecting upwardly adjacent the plate 372. The downward bias exerted on the arm 380 can be adjusted by grasping the member 388 and moving the end 386 to a different one of the notches defined by the pins 374. A second arm 392 is connected for limited pivoting about an upright axis by a bracket assembly 390 to the first arm 380. The press wheel 72 is rotatably mounted on the arm 392 by a spindle 394 for rotation in the furrow formed adjacent the rearward blade surface 38b for good soil-seed contact. A substantial portion of the forward part of the press wheel 72 overlaps the blade 38 adjacent the blade surface 38b to provide a compact arrangement. The press wheel 72 can pivot during turns for better tracking in the furrow. The wheel 72 may be angled to scrub soil toward the furrow but preferably is vertical and rotates about a substantially transverse axis.

The second press wheel 82 is supported just rearwardly of the spindle 394 on an elongated arm 398 connected to a second pivot bearing area 400 by a pivot pin 402. The wheel 82 is angled rearwardly in the outward direction for rotation against the side of the furrow formed adjacent the blade surface 38a to scrub soil toward the furrow. The staggered arrangement of the press wheels 72, 82 and disk blade 38 and gauge wheel 42 provide a relatively short fore-and-aft dimension with good trash-handling and furrowing and seed placement characteristics. Down pressure on the second press wheel 82 is adjusted similarly to that of the first press wheel 72 with a torsion spring 406 connected at one end to the arm 398 and having an end 408 with a grip member 410 for selectively positioning in nitches formed between pins 414 on a plate 416. The pin 402 extends through the pivot bearing area 402 above and rearwardly of the first pivot bearing area 370 on the extension portion 60 of the arm assembly 28. In certain soil conditions, the second press wheel assembly 80 can be omitted so only the first press wheel 72 is utilized to form the soil over the furrow.

In operation, the grain drill 10 is towed forwardly through a field, and the rockshaft 26 is pivoted to move the opener assemblies 24 downwardly to the ground-engaging position. Alternately, the arm assemblies 28 may be connected to a fixed frame member, such as a cross beam on a chisel plow frame utilized with an air drill, in which case the entire frame will be moved vertically to move the opener assemblies in the ground-engaging position. The spring assembly 64 yieldingly urges the coulter 38 into the ground with the gauge wheel assembly 42 maintaining a preselected depth of penetration of the coulter even in trashy, rough field conditions. The tire lip 274 rotates against the coulter surface 38a to clean the surface and to help maintain rotation of the coulter 38. The tire 44 also holds down trash so that the coulter 38 cleanly slices through the trash and soil and prevents soil from being thrown upwardly and outwardly from the surface 38a as the surface establishes one side of the furrow near the bottom of the coulter. The soil-firming and coulter-scraping extension 56 firms the opposite side of the furrow and removes dirt and debris from the blade surface 38b, while holding the furrow open until the seed or other material is deposited uniformly in the furrow. The press wheel 72 presses the soil firmly over the seed. In certain soil conditions, the second press wheel 82 is utilized to firm the soil on the opposite side of the furrow.

To change the depth of penetration of the coulter 38, the operator pulls the knob 300 to disengage the pin 304 from the aperture 192 in the quadrant 188 and rotates the quadrant to move the gauge wheel 242 vertically with respect to the coulter 38. A square hole 424 is located in the quadrant 188 for receiving the end of a torque wrench for ease in adjusting the depth setting. Then the knob 300 is released so that the pin 304 engages a different one of the apertures 192 corresponding to the desired depth setting to lock the spindle 180 against further rotation. The down pressure on the press wheels 72 and 82 may be adjusted by grasping the grip members 388 and 410 and repositioning the ends 386 and 408 of the torsion springs 382 and 406, respectively, in different one of the notches of the plates 372 and 416.

Having described the preferred embodiment, it will be apparent that modification can be made without departing from the scope of the invention as defined in the accompanying claims.

We claim:

1. A single disk opener assembly adapted for attachment to a frame and movable forwardly over a field where trash is present for opening a furrow in the soil, the assembly comprising:

drawbar means having a first end adapted for atachment to the frame, and a second end;

a single disk blade connected to the second end of the drawbar means for rotation about an axis offset at an angle to the direction transverse to the forward direction for forming a furrow, the angled blade thus defining forwardly and rearwardly directed blade surfaces;

a seed tube located closely adjacent the rearwardly directed surface for depositing material in the formed furrow;

a gauge wheel, and means connecting the gauge wheel to the drawbar for rotation adjacent the forwardly directed surface of the blade about an axis generally parallel to but offset from the disk blade axis to limit the depth of penetration of the blade, said gauge wheel including axially projecting means for cleaning the forwardly directed blade surface; and depth adjusting means for adjusting the gauge wheel relative to the disk blade including a shaft having a first end portion rotatably supported by the second end of the drawbar means and rotatable about an axis corresponding to the disk blade axis, said shaft including a distal end portion projection through the disk blade, an arm connected to the distal end portion and extending generally perpendicular to the shaft, and wherein the means connecting the gauge wheel includes means for rotatably mounting the gauge wheel on the arm, and means for selectively securing the shaft in one of a plurality of angularly rotated positions, said means for securing located adjacent the rearwardly directed blade surface.

2. The invention as set forth in claim 1 wherein the depth adjusting means further includes a radially extending member connected to the first end portion for rotation with the shaft adjacent the drawbar means and means for securing radially extending member to the drawbar means.

3. The invention as set forth in claim 2 wherein the radially extending member includes an apertured portion and the means for securing the radially extending member includes pin means connected to the drawbar means and engageable with the apertured portion for maintaining the shaft in one of a plurality of angularly rotated positions.

4. The invention as set forth in claim 1 including means for rotatably mounting the disk blade on the shaft.

5. The invention as set forth in claim 1 including at least a first press wheel and means supporting the press wheel adjacent the rearwardly directed surface of the disk blade with the forwardmost portion of the press wheel extending forwardly of the aft portion of the disk blade, wherein the means supporting the press wheel comprises an extension portion connected to and extending upwardly from the second end of the drawbar, a press wheel arm having a forward end pivotally connected to the extension portion at a location rearwardly and above the disk blade axis for rocking vertically with respect to the drawbar and aft end, and means rotatably supporting the press wheel on the aft end of the press wheel arm, and a compression spring assembly having one end connected to the extension portion and an opposite end connected to the frame for biasing the disk blade downwardly.

6. The invention as set forth in claim 5 wherein the press wheel rotates in the furrow, and means pivotally connecting the press wheel to the press wheel arm for pivoting about an upright axis to trail in the furrow as the opener assembly is turned from the forward direction.

7. The invention as set forth in claim 5 further comprising an adjustable torsion spring having first and second end portions, means connecting the first end portion to the press wheel arm, a grip portion extending from the second end portion, and detent means retaining the second end portion in one of a plurality of adjusted positions for varying the down pressure of the press wheel for providing an adjustable press wheel down pressure, said grip portion extending above the disk blade rearwardly of the disk blade axis in substantially all of the adjusted positions.

8. The invention as set forth in claim 5 further comprising a spring compressed between the extension portion and the implement frame for biasing drawbar means downwardly towards the soil.

9. The invention as set forth in claim 1 wherein the diameter of the gauge wheel is at least 0.8 times the diameter of the disk blade and wherein the projection means includes a lip rotating in contact with the disk blade to thereby aid rotation of the disk blade in the trash.

10. The invention as set forth in claim 1 wherein the disk blade is flat and lies substantially in a vertical plane, and wherein the disk blade axis is offset approximately seven degrees from the direction transverse to the forward direction.

11. An opener assembly adapted for attachment to a frame and movable forwardly over a field where trash is present for opening a furrow in the soil, the assembly comprising:
   drawbar means having a first end adapted for attachment to the frame, and a second end;
   a disk blade connected to the second end of the drawbar means for rotation about an axis offset at an angle to the direction transverse to the forward direction for forming a furrow, the angled blade thus defining forwardly and rearwardly directed blade surfaces;
   a seed tube located closely adjacent the rearwardly directed surface for depositing material in the formed furrow;
   a gauge wheel, and means connecting the gauge wheel to the drawbar in contact with the forwardly directed surface of the blade for rotation about an axis generally parallel to but offset from the disk blade axis to limit the depth of penetration of the blade and clean the forwardly directed blade surface while preventing soil from being thrown adjacent the furrow; and
   depth adjusting means for moving the gauge wheel relative to the disk blade, said depth adjusting means comprising: an arm having a first end connected for rotation about an axis corresponding to the disk blade axes, and a distal end, means rotatably mounting the gauge wheel on the distal end, means for rotating the arm about its rotational axis including a shaft connected to the first end of the arm and extending through the disk blade, wherein the disk blade is rotatably mounted on the shaft, means including a quadrant connected to the end of the shaft opposite the end connected to the arm for rotating the shaft and maintaining the shaft in one of a plurality of angularly rotated positions, and wherein the drawbar means includes an extension projecting radially outwardly relative to the disk blade axis, and means for adjustably securing the quadrant relative to the extension.

12. A single disk opener assembly adapted for attachment to a frame and movable forwardly over a field where trash is present for opening a furrow in the soil, the assembly comprising:
   drawbar means having a first end adapted for attachment to the frame, and a second end;
   a disk blade connected to the second end of the drawbar means for rotation about an axis offset at an angle to the direction transverse to the forward direction for forming a furrow, the angled blade thus defining forwardly and rearwardly directed blade surfaces;
   a seed tube located closely adjacent the rearwardly directed surface for depositing material in the formed furrow;
   a gauge wheel, and means connecting the gauge wheel to the drawbar for rotation adjacent the forwardly directed surface of the blade about an axis generally parallel to but offset from the disk blade axis to limit the depth of penetration of the blade, said gauge wheel including axially projecting means for cleaning the forwardly directed blade surface; and
   wherein the seed tube includes an upper portion which extends downwardly along the rearwardly directed disk blade surface forwardly of the axis of rotation of the blade to a connection with an angled portion angled toward the rearwardly directed blade surface, said seed tube further comprising a lower end portion connected to the angled portion and terminating in an opening located below the axis of the disk blade adjacent the bottom of the blade, a soil-firming and blade-scraping extension supported by the seed tube adjacent the lower end portion of the seed tube, wherein said scraping extension includes an outermost soil-firming surface adapted for engaging the soil on the side of the furrow opposite the rearwardly directed blade surface, said soil-firming surface sloping downwardly and rearwardly from the seed tube at a location forwardly of and below the axis of rotation and terminating rearwardly and below the axis adjacent the bottom of the disk blade and forwardly of the rearmost extremity of the disk blade, means pivotally connecting the seed tube to the drawbar means, and means for biasing the lower end portion of the seed tube towards the rearwardly directed blade surface.

13. The invention as set forth in claim 12 wherein the disk blade includes a central hub and wherein the angled portion of the seed tube extends around the hub and supports the lower end portion closely adjacent the rearwardly directed blade surface below the hub.

14. A single disk opener assembly for forming a trench in the soil and depositing seed therein, the assembly comprising:
   a drawbar adapted for towing forwardly over the soil,
   a single flat disk blade having first and second sides and a hub;
   means rotatably mounting the disk blade on the drawbar for rotation about a first axis in the soil, said first axis being generally horizontal and transverse to the forward direction;
   a gauge wheel supported from the drawbar for rotation adjacent the first side of the disk blade about a second axis offset from the first axis;
   means for adjusting the gauge wheel relative to the blade comprising a spindle, means rotatably connecting the spindle to the drawbar for rotation about the first axis, an elongated arm having first and second ends, said first end connected to the spindle for rotation therewith and extending radially therefrom to the second end, and means rotatably mounting the gauge wheel on the second end;
   a seed tube extending downwardly toward the soil closely adjacent the second side of the disk blade and wherein the seed tube includes means for directing seed downwardly to a location adjacent the hub generally along a vertical path and then inwardly and rearwardly around the hub towards the blade, said means for directing including an upright portion lying generally along a vertical fore-and-aft plane and a central seed tube portion angled with respect to the vertical fore-and-aft plane, said central seed tube portion lying closely adjacent the hub and imparting a transverse component to the seed for reducing the vertical velocity of the seed; and
   means extending rewardly from the seed tube adjacent the lower portion of the disk blade for forming a trench in the soil and permitting seed from the seed tube to settle into the trench.

15. The invention as set forth in claim 14 wherein the first axis is offset from the direction transverse to the forward direction so that the leading edge of the disk blade generally shadows the seed tube.

16. The invention as set forth in claim 15 wherein the first axis is offset from the direction transverse to the forward direction in the range of between five to ten degrees.

17. The invention as set forth in claim 15 wherein the means extending rearwardly includes an outermost portion extending outwardly in the direction transverse to the forward direction opposite the disk blade, said outermost portion lying outwardly of the shadow of the angled blade and cooperating with the blade for firming the sides of the furrow.

18. The invention as set forth in claim 14 wherein the seed tube extends downwardly below the first axis at a location forward of the first axis, and the means extending rearwardly extends below and rearwardly of the first axis and terminates forwardly of the rearwardmost portion of the disk blade.

19. The invention as set forth in claim 14 wherein the disk blade includes a hub rotatably mounted on the spindle and the spindle extends from the second side of the disk blade through the hub to the first side of the disk blade, and angle setting means located on the spindle on the first side of the disk blade for fixing the spindle on a selected rotated position.

20. A single disk opener assembly for forming a trench in the soil and depositing seed therein, the assembly comprising:
   a drawbar adapted for towing forwardly over the soil;
   a single flat disk blade having first and second sides and a hub;
   means rotatably mounting the disk blade on the drawbar for rotation about an axis offset at an angle to the direction transverse to the forward direction for forming a furrow, the angled blade thus defining forwardly and rearwardly directed blade surfaces;
   a gauge wheel supported from the drawbar for rotation adjacent the forwardly directed blade surface;
   a seed tube extending downwardly toward the soil closely adjacent the rearwardly directed surface;
   means extending rearwardly from the lower end of the seed tube adjacent the lower portion of the rearwardly directed blade surface for forming a trench in the soil and permitting seed from the seed tube to settle into the trench; and
   a trailing press wheel and means supporting the press wheel from the drawbar for forming the soil over the seed, said the press wheel having a forward portion which extends forwardly of the rear portion of the disk blade closely adjacent the rearwardly directed surface of the disk blade.

21. The invention as set forth in claim 20 including a second press wheel, and means supporting the second press wheel from the drawbar behind the disk blade for rotation about an axis located closely adjacent the aft portion of the trailing press wheel to form the soil on the side of the trench opposite said one side of the disk blade, said means supporting including means for angling the second press wheel to scrub soil towards the furrow.

22. In a single disk opener assembly adapted for forward movement through the soil for forming a trench in the soil and depositing material therein, said assembly including a drawbar member, a flat coulter with a hub mounted for rotation on the drawbar member, a seed boot assembly comprising: a rigid seed tube having an upright upper portion, a central portion angled rearwardly and transversely with respect to the upper portion, and a lower end portion connected to the central portion; means pivotally connecting the seed tube to the drawbar member for pivoting with respect to the drawbar member about an axis located forwardly of and above the coulter hub, the central portion extending around the hub toward one side of the coulter, and the lower end portion located below the hub; an extension portion connected to the lower end portion of the seed tube and including means for scraping said one side of the coulter; and spring means resiliently biasing the seed tube assembly about the axis for moving the extension portion towards said one side of the coulter.

23. The invention as set forth in claim 22 wherein the coulter is angled from the forward direction to define a shadow area behind the leading edge of the coulter, wherein the lower end portion is located generally in the shadow area, and wherein the extension portion includes a wedging portion located outwardly of the shadow area for firming one side of the trench.

24. The invention as set forth in claim 23 wherein the means pivotally connecting includes means for adjusting the seed tube assembly location relative to the coulter.

25. The invention as set forth in claim 22 and wherein the spring means for resiliently biasing includes a spring connected between the drawbar and the seed tube for leaf spring yeildingly rocking the seed tube about the pivot.

* * * * *